United States Patent [19]

Wicker

[11] Patent Number: 4,956,630
[45] Date of Patent: Sep. 11, 1990

[54] SAFETY UNIT ACTUATING DEVICE
[75] Inventor: James H. Wicker, Charlotte, N.C.
[73] Assignee: Specialty Manufacturing Co., Inc., Charlotte, N.C.
[21] Appl. No.: 404,789
[22] Filed: Sep. 8, 1989
[51] Int. Cl.$^5$ ............................................. B60Q 1/46
[52] U.S. Cl. ................................. 340/433; 116/28 R; 180/281; 340/487
[58] Field of Search ............... 340/433, 487, 482, 472, 340/442, 443, 436; 116/28 R, 51, 52, DIG. 15; 180/281, 271, 289; 280/765.1, 766.1

[56] References Cited

U.S. PATENT DOCUMENTS

| | | | |
|---|---|---|---|
| 4,138,668 | 2/1979 | Latta, Jr. et al. | 340/433 |
| 4,260,980 | 4/1981 | Bates | 340/436 |
| 4,300,116 | 11/1981 | Stahovec | 340/904 |
| 4,339,744 | 7/1982 | Latta, Jr. | 340/433 |
| 4,559,518 | 12/1985 | Latta, Jr. | 340/433 |
| 4,697,541 | 10/1987 | Wicker | 116/28 R |
| 4,766,413 | 8/1988 | Reavell | 340/433 |

Primary Examiner—Joseph A. Orsino
Assistant Examiner—Brent A. Swarthout
Attorney, Agent, or Firm—Shefte, Pinckney & Sawyer

[57] ABSTRACT

An improved actuating device for school bus safety unit, such as crossing arms and the like, which includes an arrangement for driving and controlling the crossing arm in a continuous predetermined arcuate path of movement, with the safety device being moved continuously back and forth in a sweeping motion that provides a moving barrier in areas adjacent the school bus where children may be placed in an unsafe situation, such as immediately adjacent the front bumper of the bus which is outside of the normal line of vision of the school bus operator. In one embodiment, an extendable line is anchored to the bus at one or both ends, and an intermediate portion of the line is engaged by the moving safety unit, whereby the line itself creates a changing barrier as the safety unit sweeps through its path of movement. A warning arrangement may also be provided to generate a warning signal to the school bus operator whenever the sweeping movement of the crossing arm is stopped or slowed, such as when a child is positioned in the path of movement of the crossing arm.

14 Claims, 6 Drawing Sheets

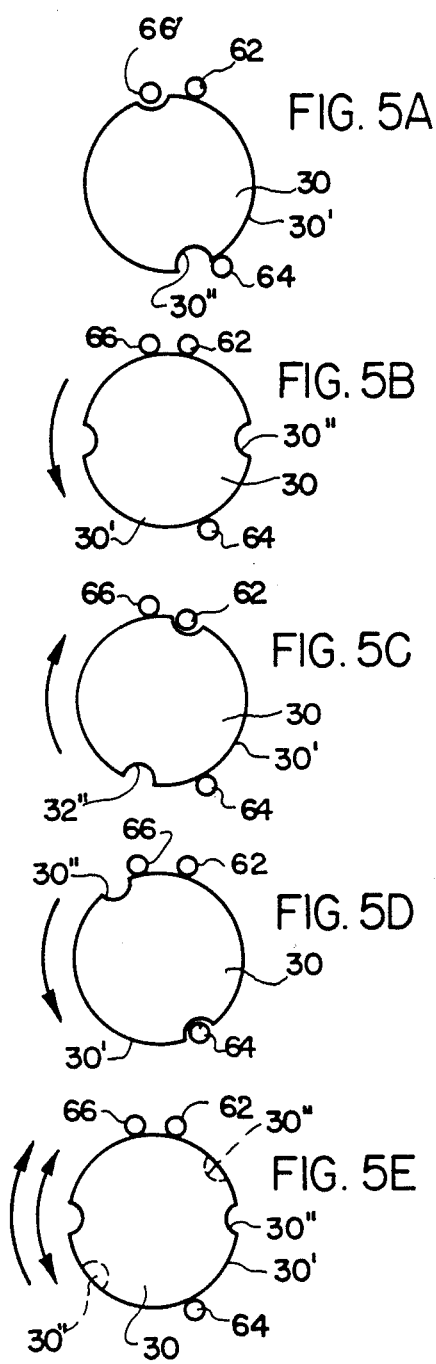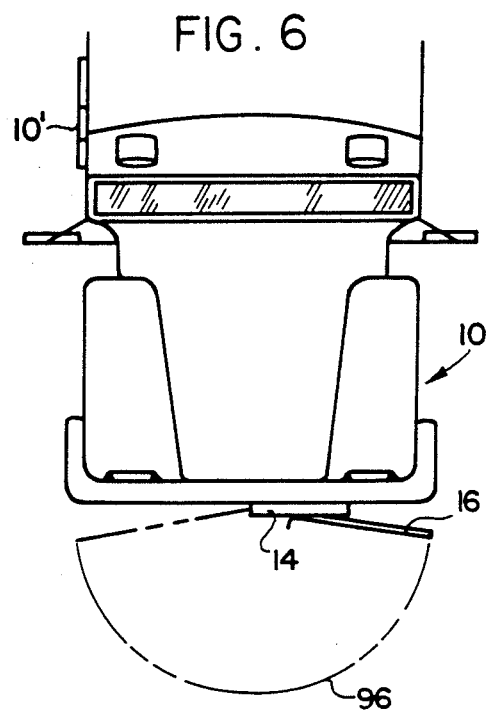

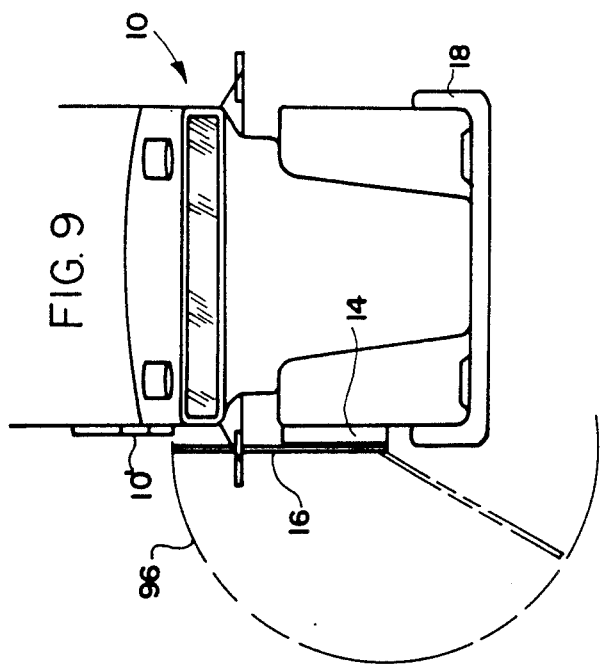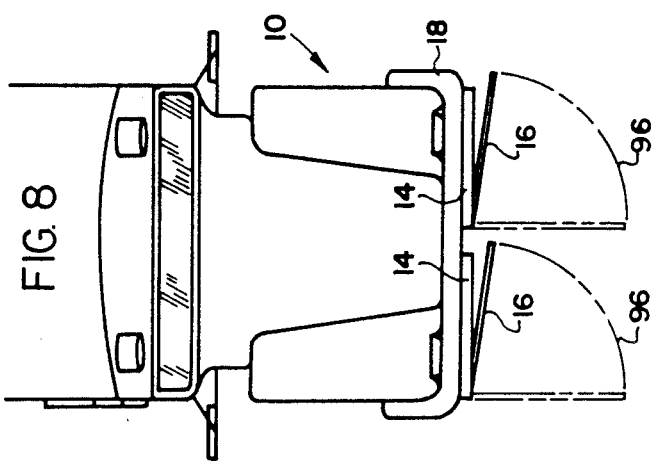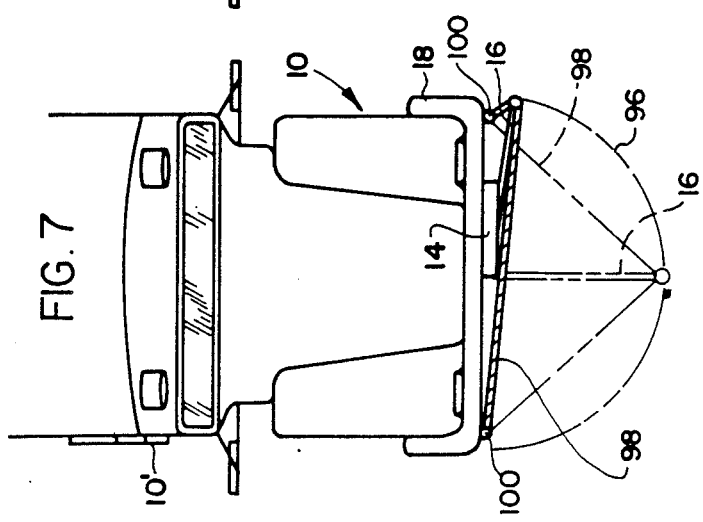

SAFETY UNIT ACTUATING DEVICE

BACKGROUND OF THE INVENTION

The present invention relates generally to devices that are mounted on vehicles to operate safety units associated with the vehicle, such as crossing arms, stop signs and the like which are mounted on school buses for selective movement outwardly therefrom to form barriers or warning devices.

It is, of course, well known that children, particularly young children, who are transported in school buses are vulnerable to accidents involving the school bus or the children themselves during the time they are leaving or approaching the school bus, and it is therefore common practice to provide school buses with safety units that are designed to reduce the risk of such accidents.

One familiar safety unit that is almost universally found on school buses is the octagonal stop sign that is usually mounted on one side of the school bus, and that is movable from a normal retracted position along the side of the school bus to an extended position projecting outwardly from the side of the bus to warn other motorists that children are leaving or approaching the school bus so that such motorists can stop all movement of their vehicles until the children have safely boarded the bus or cleared the area after leaving the bus. Typical stop sign safety devices of this type are disclosed in Latta U.S. Pat. Nos. 4,138,668; 4,339,744; and 4,559,518.

Another familiar safety unit frequently found on school buses is a crossing arm that is usually mounted on the front bumper of the school bus and that is arranged for pivotal movement from a first retracted or passive position, at which the generally lengthy crossing arm extends along and adjacent the bumper, to a second active position at which it extends outwardly and generally perpendicular with respect to the bumper, thereby providing a barrier that encourages children to walk in a path well away from the front bumper of the school bus so that the driver of the school bus can readily see the children and avoid moving the bus until they have cleared the area in front of the bus. The construction and operation of crossing arms of this type are disclosed in greater detail in Latta U.S. Pat. No. 4,559,518, Wicker U.S. Pat. No. 4,697,541 and Runkle U.S. Pat. No. 3,153,398.

As discussed in the above-identified prior art patents, the actuating devices for moving the safety units between their retracted and deployed or extended positions may be vacuum (or air) operated, or they may be electrically operated, and such actuating devices are generally designed to stop movement only at the retracted and deployed positions. However, since the safety units, at their deployed positions, are extending outwardly and generally perpendicularly from the school bus, they invite the attention of children, and others, and offer a tempting target to be pushed away from such extended position by the children passing by the extended safety unit. Also, even in their retracted positions, the safety units present a temptation for children to pull them outwardly from such retracted position. Obviously, if the actuating device for the safety unit included only a rigid drive connection between the operating mechanism (e.g. electric motor) and the movable safety unit, any such manual pushing or pulling force applied directly to the safety unit could damage or even destroy the operating mechanism of the actuating device.

To overcome this problem, it is now common practice to provide safety unit actuating devices with a double-acting hinge construction of the type generally disclosed in Latta U.S. Pat. No. 4,138,668 that includes relatively heavy coil springs that are arranged to resist any manual movement of the safety unit from its set position, and, if a manual force is applied to the safety unit of sufficient magnitude to move the safety unit from its set position, the springs will return the safety unit to its original set position. Also, there is another known hinge device that accomplishes generally the same function as the aforesaid double-acting hinge by utilizing a combination of a biasing spring and cam surface arrangement, whereby manual movement of the safety unit causes the cam to move along a cam surface until the safety unit is released, and the spring then returns the safety unit to its extended position. The cam surface has a configuration such that if the safety units moved within a predetermined range from its extended position, it will return to its extended position, but if it is moved beyond such predetermined range and toward its retracted position, it will be moved by the spring to the retracted position rather than returned to the extended position. An example of this type of hinge device is disclosed in U.S. Pat. No. 4,766,413.

More recently in my copending U.S. patent application Ser. No. 303,849, filed Jan. 30, 1989, an improved actuating device is disclosed which includes, in lieu of the aforesaid hinges, a slip clutch between the drive motor and the safety unit support that causes the safety unit to normally be positively moved from its retracted position to its deployed position, or vice versa, and which also permits relative movement of the safety unit with respect to the drive motor when a predetermined force is applied to the safety unit, such as the manual pushing and pulling thereof by a child. Several control circuits are also provided for returning the safety unit to its retracted or deployed position from which it has been moved.

In all of the aforesaid devices, the safety unit (e.g. crossing arm) is driven by an actuator, which may be an electric, air, or vacuum motor, that first moves the safety unit from a stationary retracted position adjacent the bus to a stationary deployed position, at which it remains for a period of time until its intended purpose has been accomplished (e.g. all the children have passed safely across the extended crossing area at the front of the bus). Then, the drive motor is reactivated to return the safety unit to its retracted position where it remains until it is needed again. With regard to crossing arms located on the front bumper of the bus, it is generally desirable to actuate the drive motor when the door of the school bus is first opened, whereby the crossing arm will be moved to its stationary extended position prior to the children leaving the bus, or at least prior to the time when they have left the bus and reached the front of the bus.

While such extended stationary crossing arms provide an effective barrier that normally forces children to follow a path of movement that keeps them within the sight of the operator of the school bus, it is still possible that a child leaving the bus may decide to walk along and immediately adjacent the front bumper of the school bus and then stop when he or she reaches the point at which the innermost end of the crossing arm is joined to the bumper of the school bus, which would defeat the purpose of the crossing arm since the child would be located directly in front of the bus and possibly out of the line of vision of the school bus operator seated in the bus. Obviously, under these circumstances a serious accident could occur if the operator retracts the crossing arm and drives the bus forward.

The present invention provides a safety unit actuating device which is designed to substantially eliminate the likelihood of such a serious accident occurring and to provide additional desirable safety features not found in known devices of this type.

SUMMARY OF THE INVENTION

The present invention relates to an actuating device for operating a safety unit such as a crossing arm or the like which is mounted on a vehicle, such as a school bus, and normally carried at a retracted position adjacent the vehicle. The actuating device includes an arrangement for mounting the actuating device on the vehicle and a motor having an output drive. A support is provided for supporting the safety unit (e.g. crossing arm) for movement with respect to the vehicle, and this support is arranged to normally dispose the safety unit at a retracted position, and is pivotally movable by the motor to move the safety unit away from its retracted position and through a predetermined path of movement. A control system is provide which operates the motor to selectively move the support continuously back and forth in a sweeping movement through the aforesaid predetermined path of movement so that the safety unit provides a continuously moving barrier within a predetermined area adjacent the vehicle.

In one preferred embodiment of the present invention, the control system includes limit switches or similar means for determining the outer limits of the predetermined path of movement, and these limit switches or limit means are selectively adjustable to vary at least one of the outer limits of movement so that the path of movement through which the safety unit moves can be selectively varied. Preferably, the predetermined path of movement is an arcuate path having an included angle between its outer limits that is approximately 165°.

The present invention also includes a unique feature by which a warning signal is generated whenever the presence of an object located in the path of movement of the safety unit is detected. Thus, if a child should inadvertently move into the path of movement of the crossing arm rather than going around the crossing arm, the operator of the school bus will be notified of such condition by virtue of the warning signal generated in accordance with the present invention, and corrective steps can be taken by the operator to assure the safety of the child. Preferably, the output from the motor is connected to the support means for the safety unit through a slip clutch that permits the output drive to continue its movement even when the movement of the safety unit is stopped or slowed because it has contacted a child or other object in its path of movement. Also, in the preferred embodiment, the motor is an electric motor, and the warning apparatus includes a sensor for sensing a predetermined increase in electrical current supplied to the motor which will occur whenever the normal movement of the support means through its predetermined path of movement is stopped or slowed, and a signal is generated each time the sensor senses the predetermined increase in electrical current.

In accordance with another feature of the present invention, two actuating devices may be mounted adjacent one another on the vehicle, such as on the front bumper, and these two units are then operated so that the safety units are moved in a coordinating manner to provide an effective moving barrier over a substantial area adjacent the school bus. In another embodiment of the present invention, the safety unit may be located adjacent the wheel of the school bus, and is movable from a retracted position disposed beneath the bus through a predetermined path of movement adjacent the wheel of the bus.

Finally, in another embodiment of the present invention, an extendable line, which may be made of resilient material or carried in a housing so that the variable length can be withdrawn therefrom, is used in conjunction with the moving safety unit to form an additional barrier. In a preferred embodiment, this extendable line is anchored to the bus or vehicle, and is also engaged by the extending end of the safety unit so that as the safety unit is moving through its predetermined path of movement, the extendable line will extend between the end portion of the safety unit and the school bus to provide a barrier in addition to the barrier provided by the safety unit itself.

BRIEF DESCRIPTION OF THE DRAWINGS

FIGS. 5 and 5A-5E illustrate diagrammatically the control circuit operation of the present invention;

FIG. 6 is a plan view of the front end of a school bus showing one embodiment of the safety unit arrangement of the present invention;

FIG. 7 is a plan view of the front end of a school bus showing another embodiment of the present invention;

FIG. 8 is a plan view of the front end of a school bus illustrating still another embodiment of the present invention;

FIG. 9 is a plan view of the front end of a school bus illustrating yet another embodiment of the present invention.

DESCRIPTION OF THE PREFERRED EMBODIMENTS

Looking now in greater detail at the accompanying drawings, FIGS. 1-4 illustrate the mechanical portions of the preferred embodiment of the present invention which are quite similar to the mechanical portions disclosed in the aforesaid pending U.S. patent application Ser. No. 303,849.

Figure 1:
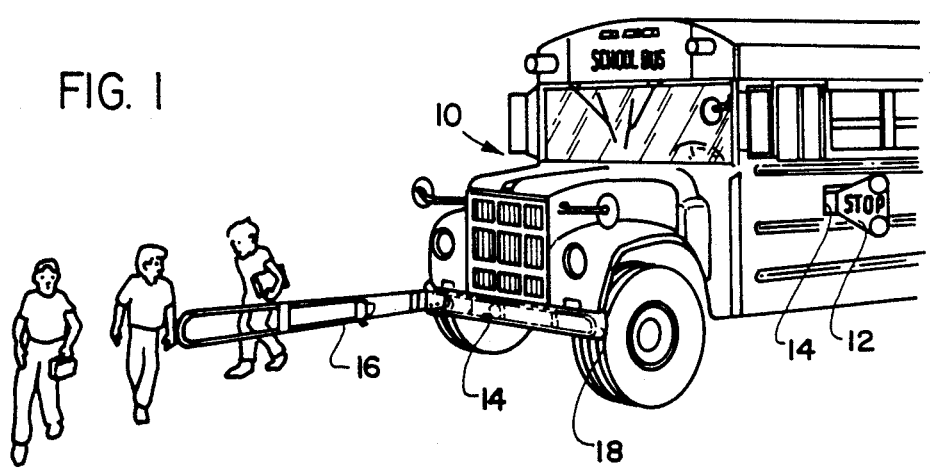
FIG. 1 illustrates a school bus employing a crossing arm safety unit including the improved actuating device of the present invention.

A typical school bus 10 is shown in FIG. 1 as having two types of safety units associated with the bus, namely a stop sign 12 carried at the side of the bus in a housing 14 for movement between a retracted position along side the bus and an extended position at which it extends outwardly from the side of the bus in a generally perpendicular relation thereto, and a crossing arm 16 carried in a housing 14 attached to the front bumper 18 of the bus, the crossing arm 16 being movable between a retracted position at which it extends along the length of the bumper 18 as shown in dotted lines in FIG. 1, and an extended position at which it extends generally perpendicular to the bumper 18 as shown in full lines in FIG. 1. The stop sign 12 performs the well-known function of alerting motorists in the vicinity of the school bus that the school bus has stopped to load or unload children, and the crossing arm 16 is moved in a predetermined path of movement when the school bus has stopped to load or unload children, whereby the children are required to walk around the crossing arm 16 in full view of the driver of the school bus so as to avoid any accidental movement of the school bus when a child is located in front of the school bus.

Figure 3:
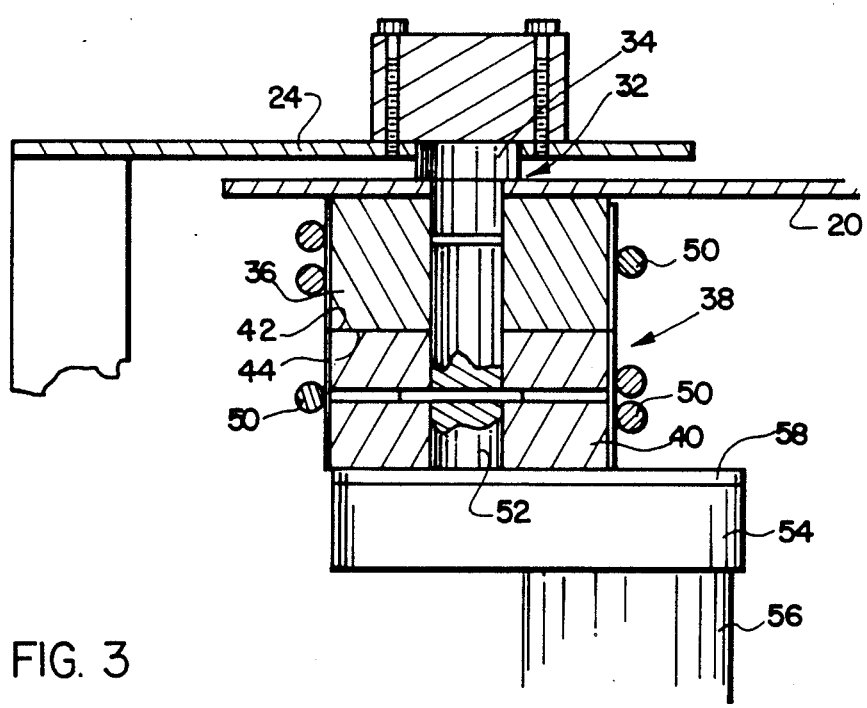
FIG. 3 is a detailed view, partly in section, illustrating the clutch arrangement of the present invention.
Figure 2:
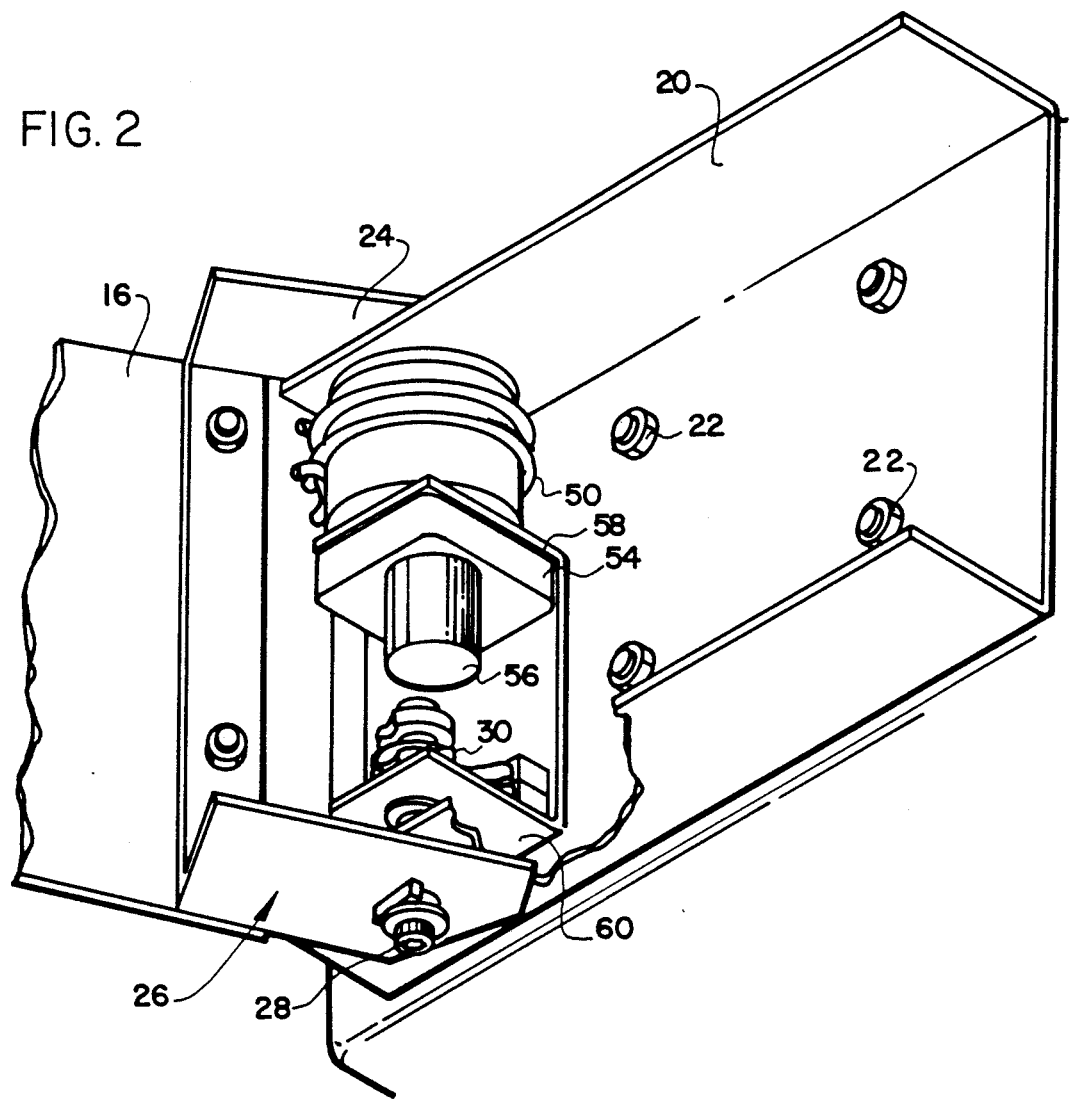
FIG. 2 is a detailed perspective view illustrating the housing and mounting arrangement for the pivotal support for the safety unit, and the drive for moving the pivotal arrangement, the electrical components being omitted from this view for clarity of illustration.
Figure 4:
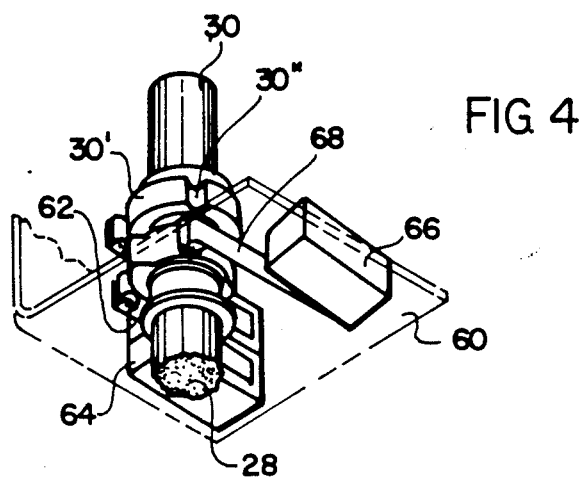
FIG. 4 is a detailed view illustrating the limit switches forming part of the control circuit of the present invention.

Since the stop sign 12 and the crossing arm 16 may be operated by substantially similar operating arrangements, only one such arrangement is shown and described in FIGS. 1–4, but it will be understood that such arrangement could be used with either the stop sign 12 or the crossing arm 16, or both. The housing 14 includes a generally U-shaped support 20 for mounting the actuating device and safety unit on a vehicle such as school bus 10 using bolts 22. A pivot member 24 is mounted to the support 20 by a first pivot shaft assembly 26 that includes, at one end thereof, a stub shaft 28 that permits pivotal movement of the pivot member 24 with respect to the support 20. The stub shaft 28 is an extended portion of a cam shaft 30 located within the housing 14 and which will be described in greater detail below. One end of the pivot member 24 is mounted on the support 20 by a second pivot shaft assembly 32 extending through the flange of the support 20 with its extending end being engaged by the first clutch component 36 of a friction clutch arrangement 38 as best seen in FIG. 3. The clutch assembly 38 also includes a second clutch component 40, the first and second clutch components 36 and 40 being generally cylindrical in shape and resting against one another at surfaces 44 and 42, respectively. A sleeve member 46 surrounds both of the clutch components 36 and 40 so as to be in contact with the external cylindrical surfaces of both such components, and the sleeve member 46 is maintained in contact with such exterior surfaces by a plurality of biasing elements 50 which are preferably in the form of steel rings expanded beyond their normal diameter so as to exert a biasing force against the sleeve member 46 and maintain it in frictional engagement with the exterior surfaces of the clutch components 36 and 40. The second clutch component 40 is generally fixed to a drive shaft 52 extending from a gear reduction unit 54 being selected to reduce the output revolutions of the motor 56 to a predetermined speed selected for use with the present invention. The electric motor 56 and the gear reduction unit 54 are preferably carried on a bracket 58 secured to the support 20, and the drive shaft 52 extends through the bracket 58 and is rotatable therein. Another similar bracket 60 is carried by the support 20, and the previously described stub shaft 28 extends through the horizontal flange of the bracket 60 to an integral connection with the aforesaid cam shaft 30, and a first limit switch 62, a second limit switch 64, and a third limit switch 66 are mounted at one surface of the bracket 60 for selective engagement with the cam shaft 30. The cam shaft 30 is specially formed with camming surfaces 30' and longitudinal grooves 30" which are generally shown in FIG. 4, and which are more specifically shown in FIGS. 5A–5E. Each of the limit switches 62-66 includes a switch element 68 extending therefrom (see FIG. 4) which is controlled by the cam surfaces 30' and the grooves 30" to move the switches between open and closed positions as will be described in greater detail below.

When the electric motor 56 is operated by the control circuit, which will be described in greater detail presently, the output from the electric motor 56 is mechanically transmitted through the gear reduction unit 54 to the output drive shaft 52 which is connected to the second clutch element 40 to rotate the same. In normal operation, the sleeve 46 and the biasing elements 50 maintain the first and second clutch components 36 and 40 in a positive driving relationship, and the output from drive shaft 52 is transmitted through the friction clutch 38 to the pivot shaft 34 and the second pivot assembly 32 to cause pivotal movement of the pivot member 24 and the crossing arm safety unit 16 supported thereby. If, however, a child or some other object should be in the path of movement of the crossing arm 16 so as to stop or significantly slow such movement, the friction clutch 38 will permit relative movement of the first and second clutch components 36 and 40 with respect to the sleeve 46, and at the surfaces 42 and 44, whereby the rotation of the drive shaft 52 can continue without burning out or damaging the electric motor 56, and the crossing arm 16 is not forced against the child or other object in its path. Further details of the friction clutch arrangement, and the advantages thereof, may be obtained from the aforesaid copending U.S. patent application Ser. No. 303,849.

Figure 5:
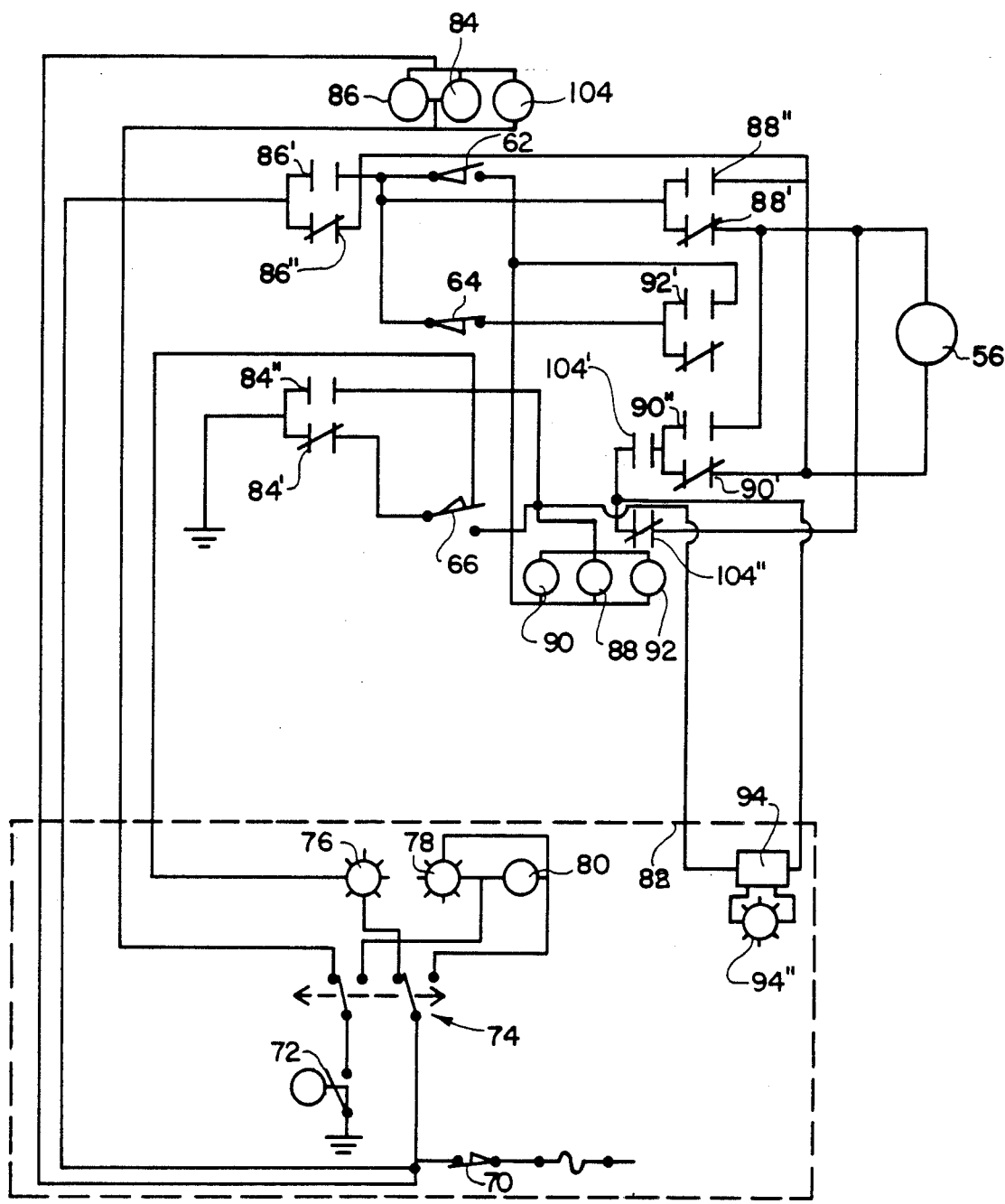

The control circuit, which is contained in the housing 14, is illustrated in FIG. 5 in conjunction with the electric motor 56, and this control circuit will be explained in conjunction with FIGS. 5A–5E which illustrate diagrammatically the various positions of the cam shaft 30 and the limit switches 62, 64, and 66. The control circuit includes an ignition switch 70, a door switch 72 which is normally open and which closes when the door of the school bus is opened by the operator, a double-pole double-throw switch 74, a green indicator lamp 76, a red warning lamp 78 and a warning buzzer 80, all of which are located within the cab of the school bus which is indicated diagrammatically by the dotted line 82. As shown in FIG. 5, the control circuit is in the condition that it would normally be during the time the bus is not discharging or receiving children, and the crossing arm 16 is carried in its normal retracted position, such as extending along and adjacent to the front bumper of the bus. In this condition, a circuit is completed through the ignition switch 70, the double-pole double-throw toggle switch 74, the green indicator light 76, limit switch 66 and the normally closed contact 84' of relay 84 to ground. The green light is illuminated in this condition of the circuit to indicate to the operator that the circuit is energized but the crossing arm or other safety unit is in its retracted position.

If the bus stops to discharge or receive children, the operator opens the school bus door 10' which closes the door switch 72 and completes a circuit from the ignition switch 70 through relays 84 and 86, through toggle switch 74 and closed door switch 72. Since the relays 84 and 86 are now energized, a further circuit is completed from the ignition switch through the now closed contact 86', the normally closed contact 88' of relay 88, the electric motor 56, the normally closed contact 90' of relay 90, the now closed contact 84" to ground. Since the motor 56 is energized to rotate in one direction in this condition of the control circuit, it will begin to pivot the crossing arm 16 through the friction clutch 38 in the manner described above, and the crossing arm will begin its pivotal movement from its retracted position and away from the bus. As soon as this movement begins, the cam shaft 30 will begin to rotate and will move from its position shown in FIG. 5A to its position shown in 5B, which are identical except that the limit switch 66 leaves a slot in the cam shaft so that the limit switch 66 in FIG. 5 moves to its lowermost contact, thereby opening the above-described circuit through the green light 76. Since the green light is no longer illuminated, the operator is made aware that the crossing arm has moved away from its normal retracted position. The control circuit will remain in this condition, and the crossing arm will continue its outward movement away from the school bus bumper, until the cam shaft 30 is rotated to the position shown in FIG. 5C, whereupon the first limit switch 62 enters a groove 30" in the cam shaft 30 and is closed. When limit switch 62 closes, a circuit is completed through ignition switch 70, still closed contact 86', limit switch 62, relays 88, 90 and 92, still closed contact 84", to ground. The energization of relays 88, 90, and 92 results in a circuit being completed through ignition switch 70, still closed contact 86', now closed contact 88", motor 56, now closed contact 90", still closed contact 84' to ground. This circuit also completes a circuit through the motor 56, but in the reverse direction to that described above, whereby the crossing arm 16 will reverse its direction of movement and begin moving back towards its retracted position. It will be noted that when the motor 56 reverses, the direction of movement of the cam shaft 30 also reverses, and the limit switch 62 (which had just closed when it entered the groove 30" in cam shaft 30 as described above) will immediately open again, so that the limit switch 62 only remains closed momentarily to energize the relays 88, 90, and 92. However, it will also be noted that even after limit switch 62 has immediately reopened, the relays 88, 90 and 92 are nevertheless maintained in their energized condition by a circuit that is completed through ignition switch 70, still closed contact 86", limit switch 64, now closed contact 92', relays 88, 90, 92, and still closed contact 84", to ground.

The crossing arm will continue its return movement toward its retracted position until the cam shaft 30 reaches the position shown in FIG. 5D, and normally closed limit switch 64 is moved to its open position, thereby opening the above-described circuit through relays 88, 90, and 92, whereupon the contacts for these three relays return to their normal condition which is shown in FIG. 5. In this condition, the direction of rotation of the motor 56 is again reversed by a circuit completed through ignition switch 70, still closed contact 86", normally closed contact 88', motor 56, normally closed contact 90', still closed contact 84", to ground. Thus, the direction of rotation of the motor 56 is now such that the pivotal movement of the crossing arm is again reversed, and it begins to move in a direction away from its retracted position, and it will continue to move in that direction until limit switch 62 enters the groove 30" in cam shaft 30 as shown in FIG. 5C and is momentarily closed as described above, whereupon the circuit through the motor 56 is again reversed in the same manner as that described above. Thus, it will be apparent that until the condition of the circuit is changed by the operator, the crossing arm 16 will move continuously through a back and forth or oscillating path of movement, the limits of which are determined by the relative position of the limit switches 62 and 64 with respect to the cam shaft 30 and the grooves 30" therein.

After the children have cleared the area in front of the bus, or whatever other area in which the safety unit may be located, the operator closes the door of the bus, which opens door switch 72, which opens the circuit through relays 84, 86, and 104. In so doing, a circuit is completed through normally closed contact 86" of relay 86, motor 56, normally closed contact 104", current sensor 94, limit switch 66 (which is at its lower contact as described above), normally closed contact 84', to ground. In this position of the circuit, regardless of the position of the crossing arm at the time the operator closes the door and opens door switch 72, the circuit through the motor 56 causes it to rotate in a direction to move toward its retracted position, and it will continue that movement until it reaches its retracted position, at which time limit switch 66 reaches a groove 30" in the cam shaft 30 as shown in FIG. 5A. Limit switch 66 then moves upwardly from its lower contact to its upper contact, thereby opening the circuit through the motor 56 and reestablishing the initial circuit condition described above and as shown in FIG. 5, with the green light 76 now being energized and the motor 56 completely deenergized so that the circuit and the crossing arm have returned to their original condition, and the bus can now begin normal operation again.

It will be noted from the description above that whenever the door switch 72 is closed and the motor 56 is energized, regardless of which direction of rotation (e.g. regardless of whether the crossing arm is being moved toward or away from its retracted position), the circuit is always completed through one or the other of the relay contacts 90' or 90", relay contact 84" and ground. In accordance with a further significant feature of the present invention, an electrical current sensor 94 is placed in the circuit between the relay contacts 90' and 90" and the relay contact 84", whereby the current passing through the motor 56 in either of its directions of movement, must also pass through the sensor 94. The sensor 94 is a conventional current sensing relay and overload protector, such as Model KBAT-240D manufactured by KB Electronics, Inc. in Brooklyn, New York. When the current flowing through the current sensing relay 94 rises to a predetermined maximum (e.g. 1.5 amps), the current sensing relay 94 trips to operate a warning device 94', which may be a warning light, a warning buzzer, or the like. In operation, when the motor 56 is energized, and the crossing arm is being moved back and forth in its aforesaid sweeping motion, the current through the motor 56 is at a normal level (0.5–0.6 amps) and the relay 94 is not tripped. However, if a child or other object is in the path of movement of the crossing arm 16, the crossing arm will contact with the child and, as described above, the friction clutch 38 will permit the crossing arm to stop its movement, or slow down its movement, while the motor 56 and the drive shaft 52 continue to rotate. However, in this mechanical condition, the first and second clutch components 36 and 40 are rotating relative to one another with respect to sleeve 46 and at the surfaces 42 and 44 which imposes a greater load on the motor 56 which is rotating the first clutch component 36. This increased load results in an increased current flowing to and through the motor 56, and this increased current trips the current sensing relay 94 in the manner described above, and the warning device 94', which is preferably located in the cab of the bus, is energized to generate a warning signal. Accordingly, when there is an abnormal situation created by a child or object in the normal path of movement of the crossing arm, or, for example, if a child should grab the crossing arm, the operator of the school bus will immediately be made aware of the abnormal situation by virtue of the warning signal generated by warning device 94' and the operator can take appropriate corrective action.

When the school bus operator closes the door 10' of the school bus 11, and the oscillating arm 16 is returning to its retracted position alongside the bumper 18 as described above, it will be noted that the warning device 94' will still be operable to generate a warning signal if a child or other obstruction is in the path of movement of the crossing arm 16. Thus, looking at FIG. 5, whenever the door 10' is open and the door switch 72 is closed, the relay 104 will be energized to close normally open contact 104' and the current sensor 94 will be energized during normal oscillating movement of the arm 16. However, when the operator closes the door 10', thereby opening switch 72, relay 104 is de-energized, and a current is maintained through the motor 56, normally closed contact 104", current sensor 94, limit switch 66 (which is at its lowermost contact in FIG. 5), normally closed contact 84' to ground. Accordingly, if a child is in the path of the crossing arm 16, the warning device 94' will generate a warning signal as described above. When the crossing arm reaches its fully extracted position with the school bus door closed, the limit switch 66 will be moved to its uppermost contact in FIG. 5, and the circuit will be in the condition shown in FIG. 5 with the motor 56 completely de-energized.

One preferred embodiment of the present invention is illustrated in FIG. 6, which is a plan view looking down at the front end of a typical school bus 10. The housing 4 of the safety unit actuating device is mounted on the front bumper 18 at a location near the midpoint thereof, and the crossing arm 16 is mounted with its above-described pivotal connection at the end of the housing nearest the midpoint of the bumper 18. The limit switches 62 and 64 are adjusted with respect to the cam shaft 30 to define a predetermined arcuate path of movement for the crossing arm 16 which is indicated by the dashed line 96. The crossing arm 16 is shown in full lines at one of the limits of its movement, and is shown in dotted lines at the other limit. Preferably, the included angle between these limits is approximately 165°, although other included angles could obviously be used by adjusting the position of limit switches 62 or 64. Looking at FIG. 6, it will be noted that the above-described control circuit will operate the motor 56 to selectively move the crossing arm continuously back and forth in a sweeping movement through a predetermined arcuate path, whereby the crossing arm provides a continuously moving barrier within a large predetermined area immediately adjacent the front end of the bus 10. Therefore, this continuous sweeping motion of the crossing arm 16 will discourage if not prevent children from walking into the semi-circular area defined by the path of movement of the crossing arm 16, and the operator of the bus will therefore always keep the children in view. Moreover, if a child should inadvertently walk into the semi-circular area, the continuously moving crossing arm will eventually make contact with the child and cause the warning device 94' to be energized in the manner set forth above.

The arrangement of the present invention provides a number of advantages as compared to the conventional crossing arm arrangements described above in which the crossing arm simply moves from a retracted position to a fully extended position (e.g. perpendicular to the front bumper) and stops, usually before the children have disembarked from the bus. In the present invention, the crossing arm is continuously moving in its oscillating path, and the movement itself will tend to attract the attention of the children in the vicinity of the crossing arm and cause them to move well beyond the path of movement of the arm. In conventional crossing arm arrangements, it is possible that a child will not notice the stationary, fully extended crossing arm until it is too late, namely after the child has already walked along the front of the bus very close to the bumper and out of sight of the driver. However, the continuous sweeping motion of the crossing arm 16 of the present invention defines the aforesaid semi-circular area in which it is active, and children are generally kept out of this entire area by the movement of the crossing arm, whereas with conventional crossing arms that stop at their deployed position, the child can walk into the area between the crossing arm and the bumper. Finally, as described above, if a child should inadvertently position himself or herself within the semi-circular area in front of the front bumper in which the crossing arm is moving, the warning device 94' will be energized and the operator can take immediate corrective action. These advantages, particularly when combined with the advantages offered by the slow movement of the crossing arm and the friction clutch drive as described in pending U.S. patent application Ser. No. 303,849, provides a significant advance in the highly important area of providing maximum safety for small children in the inherently dangerous but necessary school bus environment.

Another embodiment of the present invention is illustrated in FIG. 7 wherein the housing 14 and the crossing arm 16 are arranged on the front bumper 18 of a school bus in the same manner as that described in connection with FIG. 6 above. However, in this embodiment, a line or tape 98 having an extendable length is anchored at both of its ends to the front bumper 18, preferably near the opposite ends thereof. The portion of the line between the anchored end points thereof is engaged by the extending end portion of the crossing arm 16 so that as the crossing arm moves through its arcuate path of movement, the line 98 forms a continuously changing triangle having one leg extending from one anchor point to the extending end of the crossing arm, and the other leg extending in the opposite direction from the extending end of the crossing arm to the other anchor point. Thus, in FIG. 7, the line 98 defines an isosceles triangle when the crossing arm 16 is at the approximate midpoint of its path of movement and extending generally perpendicular to the front bumper of the school bus. The extendable line 98 can take various forms, including simply forming the line 98 out of a very resilient material which will permit it to stretch as required during the sweeping movement of the crossing arm 16. Alternatively, the line may be carried at each of its ends in a conventional spring-biased retractable casing 100, similar to an extendable and retractable measuring tape, so that as the crossing arm 16 moves away from the casing at one end of the front bumper, variable lengths of the line 98 are withdrawn from the casing, while the line is being returned to the casing 100 at the opposite end. In looking at FIG. 7, it will be appreciated that the line 98 forms a physical barrier which blocks the path of a child who might be moving toward the dangerous and somewhat critical area immediately adjacent the midpoint of the front bumper of the school bus where there is minimum visibility for the school bus operator. This physical barrier, which is a shifting triangle in shape, complements the other desirable advantages of the moving crossing arm 16 as described above.

Another embodiment of the present invention is illustrated in FIG. 8, where two actuating devices are mounted adjacent one another with the paths of movement of the continuously moving crossing arm 16 defining adjacent predetermined areas of protection in front of the school bus. With this arrangement, the two actuating devices can be controlled so that the two crossing arms 16 are moved in unison, or they can be operated in any other relationship that may be desirable such as a coordinated movement whereby they move toward and away from one another like some windshield wipers on automobiles.

In FIG. 9, one of the actuating devices of the present invention is shown located at the front right-hand side wall of the school bus, just forward of the school bus door 10', and as shown by the path of movement line 96 the crossing arm 16 provides a moving barrier that is strategically located between the school bus door 10' and the front bumper 18, whereby children who are embarking or disembarking from the school bus will be required to go around the barrier presented at the front right corner of the bus, which is another area that may be out of the line of vision of the bus operator and therefore a safety hazard.

Figure 10:
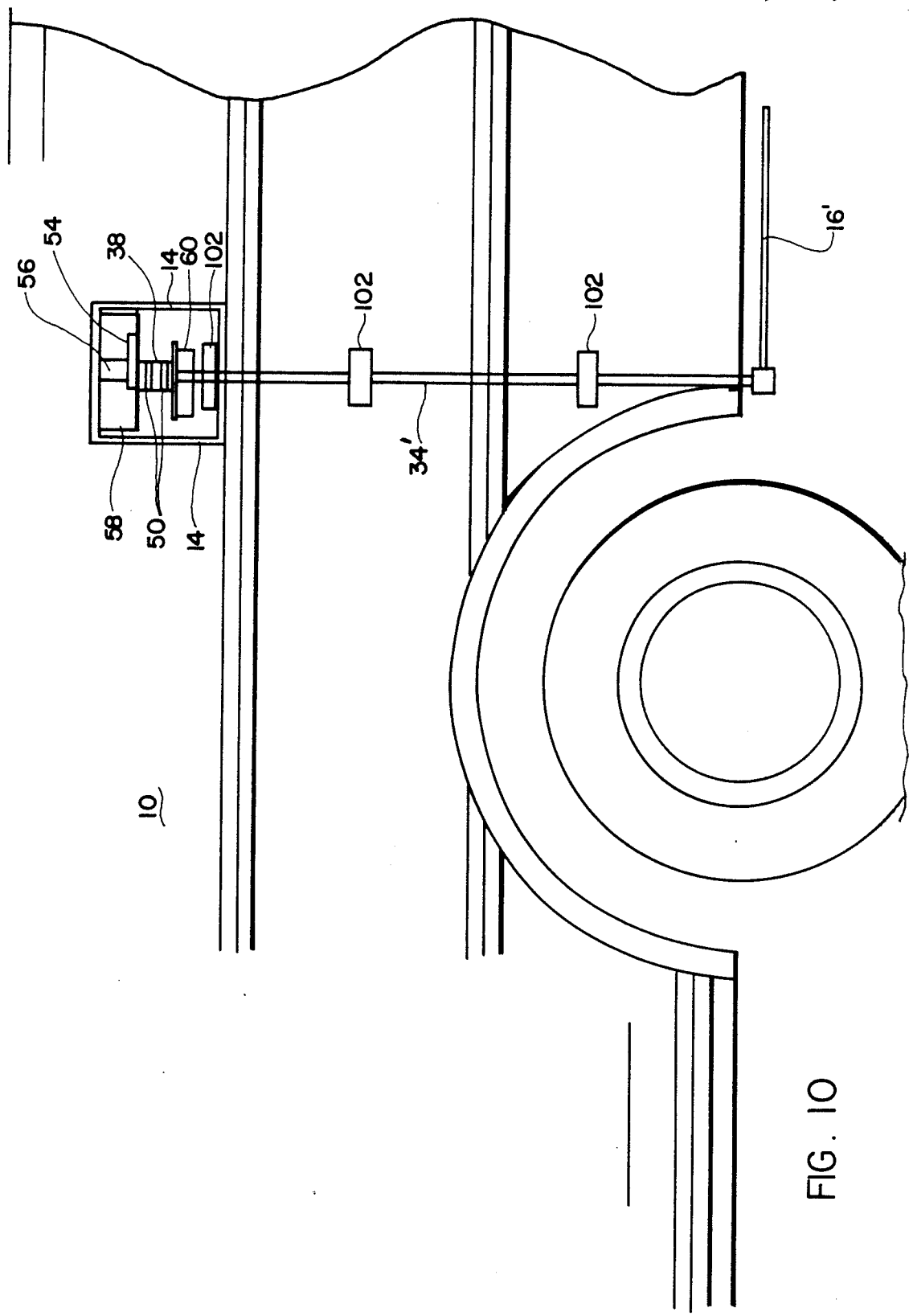
FIG. 10 is a perspective view of a portion of a side of a school bus illustrating still another embodiment of the present invention.

In FIG. 10, another embodiment of the present invention is shown, and it has particular application for use adjacent to the rear wheels of the bus. The area adjacent the rear wheels of a school bus are obviously and inherently dangerous to children, and one known method of protecting this area is to provide a radar-type device that senses the presence of a child in the area around the rear wheels and generates an appropriate signal for the school bus operator, but they are expensive to purchase and maintain. In accordance with this embodiment of the present invention, the safety unit 16' is in the form of a rod that is mounted on the side of the bus adjacent the rear wheel thereof, and this rod 16' is continuously oscillated back and forth in the same manner, and under the same control, as the crossing arm described in previous embodiments. More specifically, a housing 14 is provided for containing the motor and motor drive arrangement of the same type as that shown in FIGS. 2-4, except that the output from the friction clutch is a vertically extending drive shaft 34' that extends downwardly through bearing 102 to receive the end of the oscillating rod 16'. Preferably, in this embodiment, the retracted position of the rod 16' is either immediately alongside the side wall of the bus or can even extend to some extent beneath the body of the school bus so that it does not present a safety hazard itself and so that it does not tempt children who may be passing alongside of the bus to pull the rod 16' away from the bus. The limit switches for the FIG. 10 embodiment are preferably set to cause the continuously moving rod 16' to move in an area immediately adjacent the rear wheel of the bus so as to provide a barrier for children who may be in that vicinity.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An actuating device for operating a safety unit which is mounted on a vehicle and normally carried at a retracted position adjacent said vehicle, said actuating device including:
   (a) means for mounting said actuating device on said vehicle;
   (b) motor means having an output drive means;
   (c) support means for supporting said safety unit for movement with respect to said vehicle, said support means being arranged to normally dispose said safety unit at said retracted position thereof and being pivotally movable by said motor means to move said safety unit between said retracted position and an extended position away from said vehicle in and through a predetermined path of movement and
   (d) control means for operating said motor means, said control means having a first energized condition for continuously moving said support means back and forth between said retracted and extended positions thereof in a continuous sweeping motion to cause said safety unit to form a continuously moving barrier within a predetermined area adjacent said vehicle, and a second de-energized condition at which said continuous sweeping movement is discontinued and said safety unit is positioned at said retracted position thereof.

2. An actuating device as defined in claim 1 and further characterized in that said control means includes limit means for determining the outer limits of said predetermined path, said limit means being selectively adjustable to vary at least one of said outer limits whereby the path of movement through which said safety unit moves can be selectively varied.

3. An actuating device as defined in claim 1 and further characterized in that said predetermined path of movement is an arcuate path having an included angle between its outer limits that is approximately 165°.

4. An actuating device as defined in claim 1 and further characterized in that said actuating device includes detecting means for detecting the presence of an object located in said path of movement of said safety unit when the safety unit makes contact with said object and signal means for generating a warning signal each time the presence of said object is detected.

5. An actuating device as defined in claim 4 and further characterized in that said output drive means of said motor is connected to said support means through a slip clutch means that permits said output drive to continue its movement even when said movement of said safety unit is stopped or slowed by said object.

6. An actuating device as defined in claim 4 and further characterized in that said motor means is an electric motor, and in that said detecting means includes sensing means for sensing a predetermined increase in electric current supplied to said electric motor whenever the normal movement of said support means through said predetermined path of movement, is stopped or slowed by said object and includes a signal means for generating a warning signal each time said sensing means senses said predetermined increase in electrical current.

7. An actuating device as defined in claim 1 and further characterized in that two of said actuating devices are mounted on the front of said vehicle and adjacent one another.

8. An actuating device as defined in claim 1 and further characterized in that said support means supports said safety unit for pivotal movement with respect to said vehicle, and in that said safety unit is moved by said support means through a predetermined arcuate path of movement.

9. An actuating device as defined in claim 1 and further characterized in that said mounting means is adapted to mount said actuating device on said vehicle adjacent a wheel thereof, and in that said support means is adapted to move said safety unit from a retracted position beneath said vehicle and to continuously move said safety unit through a path of movement which defines said predetermined area as an area adjacent the side of said vehicle and adjacent said vehicle wheel.

10. An actuating device as defined in claim 9 and further characterized in that said path of movement is an arcuate path, and in that said safety unit is disposed adjacent the side of said vehicle at one outer limit of said path of movement and is disposed substantially perpendicular to said vehicle at the other outer limit of said path of movement.

11. An actuating device for operating a safety unit which is mounted on a vehicle and normally carried at a retracted position adjacent said vehicle, said actuating device including;
 (a) means for mounting said actuating device on said vehicle;
 (b) means for moving said safety unit with respect to said vehicle through a predetermined path of movement, said moving means including a motor, and a selectively disengagable coupling interconnecting said motor and said safety unit so that said motor is normally in driving engagement with said safety unit and so that said driving engagement can be disengaged when the moving safety unit makes contact with a foreign object;
 (c) detecting means for detecting the presence of said foreign object in said predetermined path of movement of said safety unit when the safety unit makes contact with said foreign object and means for generating a warning signal when the presence of said foreign object is detected.

12. An actuating device as defined in claim 11 and further characterized in that said motor is an electric motor which draws an increased electrical current when said motor is disengaged from said safety unit, and in that said detecting means includes means for detecting said increased electrical current and means for generating said warning signal.

13. An actuating device for operating a safety unit which is mounted on a vehicle and normally carried at a retracted position adjacent said vehicle, said actuating device including:
 (a) means for mounting said actuating device on said vehicle;
 (b) motor means having an output drive means;
 (c) support means for supporting said safety unit for movement with respect to said vehicle, said support means being arranged to normally dispose said safety unit at said retracted position thereof and being pivotally movable by said motor means to move said safety unit away from said retracted position in and through a predetermined path of movement, and said output drive means of said motor means being connected to said support means through a slip clutch means that permits said output drive means to continue its movement even when said movement of said safety unit is stopped or slowed by making contact with a foreign object; and
 (d) control means for operating said motor means to selectively move said support means continuously back and forth in a sweeping movement through said predetermined path of movement whereby said safety unit provides a continuously moving barrier within a predetermined area adjacent said vehicle.

14. An actuating device for operating a safety unit which is mounted on a vehicle and normally carried at a retracted position adjacent said vehicle, said actuating device including:
 (a) means for mounting said actuating device on said vehicle;
 (b) motor means having an output drive means;
 (c) support means for supporting said safety unit for movement with respect to said vehicle, said support means being arranged to normally dispose said safety unit at said retracted position whereof and being pivotally movable by said motor means to move said safety unit away from said retracted position in and through a predetermined path of movement and
 (d) control means for operating said motor means to selectively move said support means continuously back and forth in a sweeping movement through said predetermined path of movement whereby said safety unit provides a continuously moving barrier within a predetermined area adjacent said vehicle, said control means including limit means for determining the outer limits of said predetermined path, said limit means being selectively adjustable to vary at least one of said outer limits whereby the path of movement through which said safety unit moves can be selectively varied.

* * * * *

UNITED STATES PATENT AND TRADEMARK OFFICE
CERTIFICATE OF CORRECTION

PATENT NO.    : 4,956,630

DATED         : September 11, 1990

INVENTOR(S)   : James H. Wicker

It is certified that error appears in the above-identified patent and that said Letters Patent is hereby corrected as shown below:

Column 2, Lines 20-21, reads "safety units moved" but should read -- safety unit is moved --.

Column 3, Line 28, reads "is provide" but should read -- is provided --.

Column 7, Line 48, reads "86''" but should read -- 86' --.

Column 9, Line 17, reads "school bus 11" but should read -- school bus 10 --.

Column 9, Lines 43-44, reads "housing 4" but should read -- housing 14 --.

Column 9, Lines 55-56, reads "165°," ("165°" on line 55; "," on line 56) but should read -- 165°, -- (all on one line).

Column 12, Lines 40-41, reads "movement and" but should read -- movement; and --.

Column 13, Line 15, reads "movement, is" but should read -- movement is --.

Column 13, Line 50, reads "including;" but should read -- including: --.

Column 13, Line 61, after "object;" add -- and --.

Column 14, Line 48, reads "whereof" but should read -- thereof --.

UNITED STATES PATENT AND TRADEMARK OFFICE
CERTIFICATE OF CORRECTION

PATENT NO. : 4,956,630

DATED : September 11, 1990

INVENTOR(S) : James H. Wicker

It is certified that error appears in the above-identified patent and that said Letters Patent is hereby corrected as shown below:

Column 14, Line 52, reads "movement and " but should read --movement; and --.

Signed and Sealed this

Eighth Day of September, 1992

Attest:

DOUGLAS B. COMER

*Attesting Officer*    Acting Commissioner of Patents and Trademarks